Patented Sept. 4, 1951

2,566,477

UNITED STATES PATENT OFFICE 2,566,477

PROCESS FOR THE TREATMENT OF LACTEAL SERA

Ernst Abrahamczik, Herbert Petrovicki, and Friedrich Schaffernak, Heidelberg, Germany No Drawing. Application January 24, 1949, Serial No. 72,542. In Austria February 3, 1948

12 Claims. (Cl. 99—57)

The present invention relates to the treatment of sera. Throughout this application and the appended claims the term "serum" is used in a broad sense covering all aqueous liquids which have been obtained from animal body-liquids, as for example from blood, milk or lymph, by the separation of solid or semi-solid substances contained therein, as for example of blood corpuscles, albuminous substances, e. g. fibrine, or of fat or several of such substances. Initial materials which come into consideration for the process according to the present invention are above all blood serum, lymph and the various kinds of whey.

In the working up of sera which may have for its object, for example, the removal of impurities or the recovery of valuable substances contained therein, difficulties are often experienced due to the complex composition of the sera. The nature and the proportions of the anions and cations, the degree of dissociation, furthermore the nature and amount of colloidal constituents, and also the presence or absence of bacteria or other animalcules and their behaviour under the prevailing conditions, besides many other circumstances, are often of great importance in the working up of the sera. Therefore, a chemical reaction may proceed in a serum in a manner entirely different from what would be expected from the ordinary course of such reactions.

The present invention has for its object certain improvements in the working up of sera. In a more specific aspect the invention has for its object the removal of certain substances from the sera by means of ion exchanging substances. Further objects of the invention will become apparent from the following detailed description.

We have found that the treatment of sera is influenced or modified very advantageously in many respects by subjecting the sera to a treatment with ion exchanging substances. The treatment is usually effected at ordinary room temperature, but it may also be carried through at moderately elevated temperatures, care being, however, taken as a rule to avoid undesirable changes in the sera due to the action of the heat, for example to avoid a thermal flocculation of albuminous substances. Usually, temperatures of about 70° C. will, therefore, not be exceeded. The process may also be carried out while cooling, but in that case the temperature must be above the freezing point of the liquid, of course. By working at low temperatures it is possible to reduce the activity of bacteria and other animalcules which otherwise might cause undesirable changes in the sera.

Any type of ion exchanger is suitable for the treatment according to the present invention. Use may be made for example of the well-known natural or artificial zeolithes. Since, however, these zeolithes are sensitive to acids, they are suitable in most cases only for the exchange of one metallic cation against another metallic cation, but not against the hydrogen ion. In most cases it is more advantageous to use organic ion exchanging substances, for example such as are obtainable by the treatment of coal, lignite, peat or other carbonaceous materials by means of sulphonating agents, or the well-known condensation products of aldehydes, e. g. formaldehyde, with amines or with such aromatic compounds as contain a phenolic hydroxyl group or a carboxyl or sulphonic acid group or several of such groups.

In the treatment of the sera the action of the ion exchanging substances goes considerably beyond a simple interchange of ions, though of course the latter action is most important. In addition, however, substances which are not ionized are taken up by the ion exchanges which is possibly due to an adsorption, or separated thereon. This is the more surprising because well-known adsorption agents such as active carbon or silica gel do not take up or otherwise separate such substances from the sera treated. By such an additional action of the ion exchangers particularly substances impairing the taste or smell of the liquids treated or the products obtained therefrom are taken up and, if so desired, certain amounts of albuminous substances are separated. The extent to which such an additional effect of the ion exchangers takes place, depends on the conditions of each particular case, especially on the hydrogen ion concentration of the liquid under treatment, the temperature and the nature of the ion exchanger. The substances adsorbed or flocculated by the ion exchangers are usually taken up in the customary regeneration of the exchangers by the liquids employed for the regeneration, or they may be dissolved from the exchangers before the regeneration of the latter, for example by rinsing with water, or by a treatment with organic solvents, e. g. primary aliphatic alcohols, or by a treatment with reducing agents. In any case they may be recovered, if so desired, in any suitable manner.

It depends upon the working conditions employed in each case in which manner and to which extent an exchange of ions takes place. By a suitable selection of the ion exchangers the results obtained may be varied considerably. For example, by a treatment with one or more cation exchangers the cations contained in the serum may be interchanged for others so that for example calcium ions may be replaced by sodium ions. Generally speaking, it is most suitable in most cases to effect an exchange of anions, and in many cases a treatment with both anion exchangers and cation exchangers will prove advantageous. Since the exchange of ions is an equilibrium, it is usually not possible to effect a sufficiently far-going exchange by a single treatment with the exchanger or exchanger group; it is rather desirable to effect the treatment repeatedly, for example by collecting the liquid leaving the exchange device and passing it again over the exchanger or exchanger group, if necessary after regeneration of the latter.

By suitably selecting the working conditions it is possible to leave a certain amount of inorganic constituents, especially of calcium and of phosphoric acid, in the treated sera. Apparently, these amounts of inorganic constituents are present originally in a non-ionizable state of combination, presumably chemically combined to such organic substances as albuminous materials or lactose; in this non-ionizable state they are readily soluble in water and have a very favorable action physiologically; thus, they differ substantially from the simple salts of the said inorganic constituents. The said object may be attained for example by incompletely regenerating the ion exchangers used, i. e. by employing them in a state of reduced activity, or by passing the sera to be treated rapidly over the ion exchangers. By employing stronger conditions of working, for instance by passing the sera less rapidly over the exchangers or by employing exchangers which have been regenerated to a far-going extent, the inorganic constituents originally present in a non-ionizable state may also be removed from the sera under treatment, the non-ionizable combination being apparently converted into an ionizable one; in the latter case products are obtained which are completely or nearly completely free from inorganic constituents.

How the process according to the present invention is best carried through depends on the circumstances of each particular case and more particularly on the nature of the serum and the result to be obtained. In the following, the several possible modifications of the process and the results obtained thereby will be explained in detail first with reference to the treatment of whey. In this case, the procedure may be as follows:

When treating the whey with a base exchanger, i. e. a cation exchanger, which has been pretreated by means of a sodium chloride solution, a conversion takes place; the calcium ions are largely removed from the solution and the equivalent amount of sodium ions passes into solution. The whey thus treated may be subjected to a more or less far-reaching drying operation and thus converted for example into a product containing albumin which is suitable as a spice for soups or as an addition to such spices.

When treating the whey with an anion exchanger which has been pretreated by means of a caustic alkali or alkali metal carbonate solution, the exchanger takes up acid anions of the whey and gives off to the liquid an equivalent amount of hydroxyl ions. It is surprising that in this case the whey which contains alkali metal salts of one or more strong acids (in a largely dissociated state) as well as one or more free weak acids, in particular lactic acid (in a slightly dissociated state) is freed in the first place from the anions of the strong acid or acids which even replace in the exchangers such anions of weak acids as may already have been bound therein. By suitably selecting the amount of the ion exchanger a liquid may therefore be produced which no longer contains any substantial amount of strong acids either in the free state or as salts. The anions of the weak acids remaining in the liquid may now be exchanged in another treatment with an anion exchanger against hydroxyl ions and thus removed from the liquid.

In most cases it is more advisable to treat the whey not only with one or more anion exchangers, but also with a cation exchanger. By a treatment with anion exchangers alone it is in many cases not possible to remove from the whey the weak acids, the separation of which is usually the most important. In order to attain this object, the anions of the strong acids and then the metallic ions or, inversely, first the metallic ions and then the anions of the strong acids must be removed; only when this has been done may the weak acids be separated by ion exchange. Accordingly, the whey will be treated first with an anion exchanger, then with a cation exchanger, and thereafter again with an anion exchanger, or else first with a cation exchanger and then with several anion exchangers.

By combining the treatment of the whey by means of ion exchangers with other treatments the results of the process may be varied considerably. However, attention must be called to the fact that it is often advisable or even necessary, especially when recovering albuminous materials or mixtures containing the same, to maintain a certain degree of acidity within the liquid. The reason is that during evaporation or drying of the liquid the hydrogen ion concentration is reduced in almost all cases, i. e. the pH value is increased. If the exact neutralization point is surpassed, however slightly this may be, the products obtained on evaporation often have a dark colour and a bad taste. These drawbacks are avoided by maintaining the liquid during evaporation and drying in a faintly acid state; this is achieved in a most simple manner by not completely deacidifying it in the treatment with the ion exchangers. For this purpose the whey may first be freed from metallic ions by means of a cation exchanger, then passed over two anion exchangers in succession—the treatment with the cation exchanger and the two anion exchangers being repeated, if necessary, because the ion exchange is an equilibrium reaction—and the last anion exchanger is switched off from time to time, so that a certain amount of weak organic acids remains in the whey.

While having regard to this precaution, the whey may for example be freed from acids and salts to a large extent or practically completely by means of ion exchangers, and then converted by evaporation into dry products which have a very pleasant taste and smell and which are different in their solubility from albuminous materials and are suitable for example for the preparation of infants' food. The treated whey may also be worked up for the production of pure lactos or of albuminous materials or of both, whether singly or in mixture with each other, the proportion of the components in the latter case being capable of variation within wide limits.

There are several ways of recovering the albuminous substances of the whey. For example, they may be precipitated by the action of heat or of precipitating agents and separated from the liquid by filtration or centrifuging, whereupon the liquid is freed by ion exchange from salts and acids including an excess of ionized precipitating agents, if such has been employed, and is concentrated or dried by evaporation. In this case albuminous substances are obtained which contain part of the salts originally present in the whey and which, moreover, often are mixed with the precipitating agents or the conversion products of the latter; therefore, they may have undesirable effects on the human organism, especially in the case of infants, and consequently are difficult to make use of. It is more advantageous, therefore, first to free the whey by ion exchange from salts and acids (of course while having regard to the precaution abovementioned), then to precipitate the albuminous materials, which is perfectly done by heating, and after separating the precipitated albuminous substances from the liquid, to concentrate and if desired to dry the latter. The precipitation of the albuminous substances by heating proceeds particularly readily after the separation of the salts and acids by ion exchange, so that heating to a temperature of from about 60° to about 70° C. is usually sufficient to precipitate all albuminous substances of the whey which are capable of thermal precipitation at all. The last-mentioned modification of the process results in a very far-going separation of lactose and albuminous substances from each other so that the latter, while free from the unpleasant taste and smell of the whey, do not possess any sweet taste. For many purposes it is, therefore, still more advantageous first to free the whey by ion exchange from salts and acids (again while having regard to the aforesaid precaution), then to concentrate it by evaporation for example to one fifth or even one tenth of its original volume, and only then to separate the albuminous substances, preferably by heating and centrifuging, whereupon the separated solids and the remaining liquid are dried separately. On the one hand a mixture of albuminous substances and lactose, in which the proportion of the constituents can be controlled by the conditions of the centrifuging treatment, and pure lactose on the other hand are obtained.

When freeing the whey by ion exchange completely or practically so from metallic ions and also from part of the acids and then heating it to between about 40° and about 100° C., some substances contained in the whey undergo a conversion, the nature of which is not known with certainty; possibly it is a displacement of an equilibrium, perhaps that between α-lactose and β-lactose. When removing from the thus treated liquid, either while it is still warm or after cooling, the remainder of the acid anions by ion exchange and evaporating the liquid, products are obtained which have a much sweeter taste than those obtained without the said heat treatment. It is necessary, however, that the evaporation or drying of the treated liquid is effected very rapidly, for example on drying rollers or better still in a spray drying device, or at comparatively high temperatures of about 90° C. or more, or while using both measures; otherwise, another conversion might take place due to which the highly sweet taste of the products disappears again.

The treatment with the ion exchangers may also be utilized for promoting fermentative processes, for example a lactic acid fermentation, by removing from the solution undergoing fermentation either continuously or at intervals part of the acids formed, for example to such an extent that the hydrogen ion concentration which is most favourable for the fermentation is about maintained. Moreover, fermentation proceeds in a particularly rapid and smooth manner after the whey has been treated with the ion exchangers.

In case the whey treated contains bacteria or other animalcules giving rise to fermentation the action of the latter may impair the deacidification produced by the ion exchangers by giving rise to subsequent fermentation. In such cases it may therefore be advantageous either to sterilize the whey before the treatment with the ion exchangers or as soon thereafter as possible or else, if the solution is to be concentrated by evaporation after treatment with the ion exchangers, to carry through this evaporation in an acid medium in which the activity of the fermenting animalcules is reduced, for example by effecting the evaporation after the treatment of the whey with the cation exchanger but before the treatment with the last anion exchanger.

A treatment with ion exchangers is advantageous also in case the whey or some of its constituents are to be subjected to hydrolysis, for example for decomposing albuminous substances to amino acids or for converting lactose to glucose and galactose. For this purpose the whey may be treated with a cation exchanger in such a manner as to remove the metallic ions. The free strong acids formed in this treatment, if necessary with the addition of further amounts of strong acids, then serve for effecting the hydrolysis in the known manner, for example by heating under elevated pressure. After the hydrolysis the strong acids and also part of the amino acids formed may be removed from the solution in the manner described above by means of anion exchangers.

The process in accordance with the present invention may also be combined with other treatments of the sera. For example, the whey may first be deacidified electrolytically, whereupon the salts may be removed from the liquid by treatment with ion exchangers.

As will be seen from the foregoing explanations, the process according to the present invention permits of obtaining products from the whey, the properties of which may vary within very wide limits, but which are very valuable for a large number of purposes. The contents of the products in salts may be controlled at will; this circumstance and also the fact that they can be obtained in a state practically free from salts (for example below about 0.2° or 0.1 per cent of salts in the dry state), renders them particularly suitable for the production of infants' food having no laxative action. The products are perfectly stable, even when stored in moist air, and also their sweet taste, if they possess it originally, is not altered, which means that their chemical composition remains unaltered. The products are thus fundamentally different from all dry products hitherto obtainable from whey. It is also surprising that after the treatment with the ion exchangers certain aromatic substances contained in the whey are noticed in some cases, the action of which had apparently been impaired by the salts and acids present in the original whey.

Depending on their composition the products may be employed for different purposes. The preparation of a spice for soups or a component for such spices has already been mentioned above. Lactose may be employed as such, for example for producing nutritive preparations or for making up pharmaceuticals, or converted further in any suitable manner, for example converted into lactic acid by fermentation or split up into glucose and galactose. The albuminous substances of the whey may be obtained free from sugars as preparations having a pleasant taste and devoid of disagreeable smell, or also in mixture with more or less large amounts of lactose. Instead of pure lactose or in addition thereto, products may be obtained which have a particularly sweet taste, whether alone or in mixture with albuminous substances, which products are particularly suitable for making food preparations or pharmaceuticals. It is even possible to prepare a product which in its composition rather closely resembles human mother milk, though it is different therefrom with regard to the nature of the albuminous materials and of the hormones; for this purpose a mixture of the albuminous substances and lactose is prepared from the whey and converted, together with cow's milk or cream, into a concentrated liquid of the nature of condensed milk or into a solid product similar to milk powder.

It is often desirable to work up the products resulting from the process described in the foregoing together with other albuminous materials or with materials containing carbohydrates or with both, for example with whole milk or cream or dry products obtained therefrom or with malt, cocoa or substances improving or modifying the smell or taste. It is particularly advantageous to add these other substances while the products obtained from the whey are still in a liquid state, i. e. before or during the evaporation or drying and in any case before they have been dried completely. In order to avoid crystallization of lactose or other carbohydrates which might take place under certain circumstances, it may be advisable also to add to the mixtures, before drying, protective colloids or emulsifying agents, as for instance gelatine, whereby particularly uniform products are obtained.

In a manner similar to that described in the foregoing with regard to the treatment of whey, the treatment of other sera, for example of blood serum, may be carried through. In this case, however, regard must be had to the fact that some albuminous substances are precipitated at the so-called isoelectric point. It is therefore advisable as a rule to take care in the removal of acids by ion exchange that this iso-electric point is not reached or passed through, so as to avoid an undesirable precipitation of such albuminous materials as for example globulines. Due to their different composition the products obtained from sera other than whey are used in part for other purposes. In practically all cases they are valuable initial materials or assistants for the pharmaceutical industries.

Of course, the products obtained from whey may be combined with those obtained from blood serum or other sera, or the whey may be mixed with blood serum and the mixture treated in the manner described above.

The following examples will further illustrate how the process according to our invention may be carried out in practice. It is to be understood, however, that our invention is not limited to these specific examples which are given for the sole purpose of further illustration, the exact scope of our invention being defined in the appended claims. The parts indicated in the following examples are given by volume.

*Example 1*

1000 parts of whey are passed in the course of 30 minutes over 200 parts of an anion exchanger which has been obtained by the condensation of aromatic and aliphatic amines with formaldehyde and washed with sodium carbonate solution. The spent exchanger is regenerated by means of 100 parts of sodium carbonate solution of 10 per cent strength. The liquid resulting from the treatment of the whey has a pH value of 6.3 and no longer possesses an acid taste. It is heated to 65° C. and freed from the separated albuminous substances by filtration. It is then heated in the course of 15 minutes to between 70° and 75° C. and again freed by filtration from the albuminous materials which have separated. The liquid now contains, in addition to the salts of milk, mainly the lactose and those albuminous substances which cannot be precipitated by heat. It may be worked up in one of the following manners:

(a) 1000 parts of the liquid are subjected to a lactic acid fermentation in the known manner whereby the acid formed is neutralized by the continuous addition of calcium hydroxide. When the fermentation is complete, the solution is passed over a cation exchanger which has been obtained by condensation of aromatic compounds containing sulphonic acid groups in the nucleus with formaldehyde, regenerated by means of hydrochloric acid of 10 per cent strength and washed with water. In this treatment 80 per cent of the calcium is removed so that the solution now has a strongly acid reaction (the pH value is 1.5). The solution is now passed over 1000 parts of an anion exchanger which has been obtained by condensation of aromatic and aliphatic amines with formaldehyde, treated with sodium carbonate solution of 10 per cent strength and washed with water. In this exchanger the acids of the fermented solution are bound; they may be recovered therefrom as a solution of the corresponding sodium salts by regenerating the exchanger by means of sodium carbonate solution.

(b) The solution is subjected in a fermentation tank to a lactic acid fermentation by means of a culture of *Bacillus leichmanni*. Part of the liquid is continuously withdrawn from the fermentation vessel, passed over 200 parts of an anion exchanger obtained by condensation of aromatic and aliphatic amines with formaldehyde and treated with sodium carbonate solution of 10 per cent strength, whereupon the solution is recirculated into the fermentation tank until a sample does no longer show any substantial increase of the contents in acid. The ion exchanger is regenerated by means of 100 parts of sodium carbonate solution of 10 per cent strength as soon as the liquid leaving the exchanger is more strongly acid than corresponds to the pH value of 5.

*Example 2*

1000 parts of acid whey are passed over 200 parts of a cation exchanger which has been obtained by the condensation of aromatic aldehyde sulphonic acids with formaldehyde and treated with hydrochloric acid, and then over 100 parts of an anion exchanger which has been obtained by condensation of aliphatic and aromatic amines with formaldehyde and treated with sodium carbonate solution of 10 per cent strength, until the liquid leaving the exchangers contains no longer chlorine ions. The solution freed from chlorine is then passed over 100 parts of the same anion exchanger which has been regenerated with sodium carbonate solution, and thereafter over another 200 parts of the same anion exchanger, whereby the solution is completely deacidified. By regenerating the three anion exchangers there are obtained in the form of the sodium salts from the first exchanger the whole of the hydrochloric acid besides 10 per cent of other acids, from the second exchanger 80 per cent of the total phosphoric acid besides 20 per cent of other acids and from the third exchanger mainly lactic acid.

Example 3

1000 parts of whey obtained by means of rennet are passed over 250 parts of a hydrogen ion exchanger which has been obtained by a sulphonating treatment of coal, treated with 40 parts of 10 per cent hydrochloric acid and washed with 500 parts of water. A strongly acid solution is obtained (the pH value is between 1 and 1.5) which on evaporation and calcination leaves a residue of 0.2 per cent which means that the contents of the solution in salts has been reduced to a quarter. The solution may be further treated in one of the following manners:

(a) It is passed over 200 parts of anion exchanger which has been treated with sodium carbonate solution. The resulting solution has a neutral reaction. By evaporating it to dryness a product is obtained which no longer has the rather unpleasant taste of untreated whey or products obtained therefrom and which is excellently suitable for producing foodstuffs of many types.

(b) For decomposing the lactose the solution is subjected to an inversion in the usual manner, for example by heating with sulphuric acid to 85° C. or above. Thereafter it is passed over a hydroxyl ion exchanger and thereby deacidified. From the resulting liquid glucose and galactose may be obtained in the known manner, for example by evaporation, the galactose crystallizing first due to its low solubility.

Example 4

1000 parts of acid whey are passed first over 200 parts of a cation exchanger obtained by condensing aromatic compounds containing sulphonic acid groups in the nucleus with formaldehyde and then over two portions of 200 parts each of an anion exchanger obtained by condensation of aromatic and aliphatic amines with formaldehyde, the said exchangers serving as hydrogen ion and hydroxyl ion exchangers, respectively. The resulting solution has an acid value of 4.5 according to Soxhlet-Henkel and a pH value of 6.0. Upon regeneration of the anion exchangers mainly the inorganic acids are recovered from the first and mainly the organic acids from the second exchanger.

Example 5

1000 parts of acid whey are deacidified by means of ion exchangers and freed from albuminous substances in the manner described in the first paragraph of Example 1. The solution is then passed over hydrogen ion and hydroxyl ion exchangers of the same kind as mentioned in Example 1 and thus freed from the bulk of the salts. Thereafter it is passed over 250 parts of a hydrogen ion exchanger and thereby freed from the remainder of the metallic ions. The liquid thus obtained has a combustion residue of only 0.01 per cent and accordingly is practically free from bases. It is now heated for some time to between 50° and 60° C. and then passed over a hydroxyl ion exchanger which has been obtained from aromatic and aliphatic amines and regenerated by means of sodium carbonate. The resulting solution has a pH value of between 6 and 6.5 and a very sweet taste. It may be pasteurized and then concentrated in a vacuum evaporator until a product is obtained which contains 40 per cent of dry substance. This paste has a pleasant sweet taste and is therefore suitable for the production of baked goods and sweets. By completely drying the paste in a spray drayer a dry product is obtained which behaves to fermentation producers like galactose and has a very pure and sweet taste in comparison with dried whole milk.

Example 6

1000 parts of a whey concentrate obtained in the usual manner by concentrating whey in a vacuum evaporator to about one fourth of its original volume are passed over 2000 parts of an anion exchanger which has been obtained by condensation of aromatic and aliphatic amines with formaldehyde and treated with sodium sulphate. Thereby the solution is freed from buffer systems (weak acids—salts of these weak acids) so that the addition of only a small amount of acid strongly reduces the pH value of the solution. The solution is now passed over 2000 parts of a cation exchanger which has been regenerated by means of hydrochloric acid of 10 per cent strength, and thus freed from metallic ions, then evaporated to about half its original volume and mixed with so much sulphuric acid that it contains about 1 per cent thereof. Thereupon it is heated for about 5 hours in an autoclave to 115° C. whereby the lactose is split into glucose and galactose and the albuminous material is in part decomposed to amino acids. The resulting product is passed over a hydroxyl ion exchanger obtained by condensation of aliphatic and aromatic amines with formaldehyde and regenerated by means of sodium carbonate solution of 10 per cent strength. Thereby the liquid is deacidified. Thereupon is dried. The dry product may be pressed into tablets without difficulty and may be employed for pharmaceutical purposes as such or in conjunction with other materials.

Example 7

1000 parts of whey are subjected to a sodium conversion by passing it over 300 parts of a natural green sand treated with 100 parts of sodium carbonate solution of 10 per cent strength, which serves as a cation exchanger. The resulting solution is then passed over 200 parts of an anion exchanger obtained by the condensation of metaphenylene diamine with formaldehyde and treated with 100 parts of 10 per cent sodium chloride solution. The salts originally contained in the whey have now been converted practically completely into the corresponding amount of sodium chloride. By evaporating the solution a concentrate or even a dry product is obtained which has pleasant salty taste, and which may be employed for example as a spice for soups or as an addition to molten cheeses.

Example 8

1000 parts of milk serum obtained from butter-milk by centrifuging are passed over 200 parts of an anion exchanger obtained by the condensation of meta-phenylene diamine with formaldehyde and treated with sodium carbonate solution. The liquid then has a pH value of 6.5 and no longer possesses an acid taste. Before regenerating the spent ion exchanger the latter is strongly rinsed with water whereby those albuminous substances which have been separated on the exchanger are obtained in the form of an aqueous suspension which may be worked up by centrifuging. Also the colouring matters of the milk serum and the vitamines, especially lactoflavine, are partly retained by the exchanger and may be recovered therefrom either by extraction by means of organic solvents, e. g. primary aliphatic alcohols, or after a reduction by means of sodium hydrosulphite solution, whereupon they may be worked up in any known manner.

Example 9

200 parts of a cation exchanger obtained from phenol sulphonic acid and formaldehyde and regenerated by means of hydrochloric acid of 10 per cent strength are stirred into 1000 parts of neat's blood serum containing 7.7 per cent of dry substance and 0.7 per cent of ashes. The said exchanger is removed by filtration and the strongly acid solution is then stirred with such amounts of an ion exchanger obtained by condensation of formaldehyde with aliphatic and aromatic amines and regenerated by means of sodium carbonate solution that the pH value of the resulting liquid amounts to 6.0. During this treatment albuminous substances are flocculated. They are separated and the treatment with cation and anion exchangers is repeated, the amounts of the exchangers being about ⅕ of those required in the first stage. The serum thus freed from salts contains only 0.05 per cent of ashes. It may be worked up to dry products, which may serve for example as highly nutritive food for convalescents.

Example 10

Skimmed milk is treated in the customary manner with hydrochloric acid in order to obtain a light coloured casein suitable for the production of glue and for pharmaceutical purposes. The resulting liquid which still contains hydrochloric acid is treated with ion exchangers in the manner described in Example 4. A solution is obtained which, upon evaporation and drying, yields a valuable sweet mixture of albuminous materials and carbohydrates which may be used as a nutrient.

Example 11

To 110 parts of whey which has been treated with ion exchangers in the manner described in Example 5, 50 parts of milk are added, and the mixture is evaporated until the contents in dry substance amounts to 25 per cent. The mass is then dried in a spray-drying device. The resulting product has a pleasant sweet taste and contains a physiologicaly favorable mixture of albuminous materials, carbohydrates, vitamines and salts; it may be employed for many purposes in the nutrient industries.

Example 12

0.25 part of gelatine is added to 100 parts of whey which has been treated with ion exchangers in the manner described in Example 5. The mixture is warmed until the gelatine has been dissolved completely and then evaporated in vacuo. No separation of albuminous susbtances takes place and the concentrate obtained is a uniform viscous liquid. It may be employed as such for the production of beverages or converted into dry products having a very favorable physiological effect.

Example 13

1000 parts of whey are passed through a system of 4 ion exchange filters, arranged in series of which the first and third contain 120 parts each of a cation exchanger giving off hydrogen ions, the second and fourth 150 parts each of an anion exchanger giving off hydroxyl ions. Thereafter filters Nos. 1 and 2 are regenerated.

Another 1000 parts of whey are now passed first through the partially spent filters Nos. 3 and 4, then through the regenerated filters Nos. 1 and 2, and are then concentrated and dried. An albuminlactose preparation is obtained which contains no chlorides and no substantial amount of alkali, but a substantial amount of the calcium and phosphoric acid originaly contained in the whey. The latter two constituents are present in the product in a readily soluble, practically completely non ionizable form.

What we claim is:

1. The process of treating whey comprising removing weak acids and salts of weak acids therefrom by passing the whey in contact with an anion exchange material, partially removing metal ions from the treated whey by passing it in contact with a cation exchange material, concentrating the last treated whey, hydrolyzing part of the organic constituents by heating the concentrate to a temperature up to 115° C. and in the presence of a minor portion of a mineral acid, deacidifying the hydrolyzed concentrate by passing it in contact with a hydroxyl ion exchange material and collecting the treated concentrate.

2. The process of treating whey comprising passing the whey in contact with an anion exchange material to produce a lacteal liquid of a pH of about 6.3, heating the liquid to 65° to 75° C. and removing coagulated albuminous substances from the liquid, fermenting the lactose in the liquid, neutralizing acid formed during the fermentation with calcium hydroxide, passing the liquid in contact with a cation exchange material and removing a major portion of the remaining calcium from the liquid, passing the liquid having a resultant low pH value in contact with an anion exchange material and recovering the remaining liquid, and further recovering the acid ion values from the last anion exchange material by regeneration with an alkali metal compound.

3. The process of treating whey comprising passing the whey in contact with an anion exchange material to produce a lacteal liquid of a pH of about 6.3, heating the liquid to 65° to 75° and removing coagulated albuminous substances from the liquid, initiating a lactic fermentation in the liquid, passing the fermented liquid in contact with an anion exchange material and recirculating the liquid therefrom to the fermentation step until no rise in acidity occurs in the liquid withdrawn from the fermentation step, and recovering a liquid product therefrom of a pH value of about 5.

4. The process of treating whey which comprises passing the whey in contact with an anion exchange material to remove chlorine, passing then the liquid in a second step in contact with an anion exchange material to remove phosphoric acid, passing subsequently the liquid for the third time in contact with an anion exchange material to remove lactic acid, and recovering the phosphoric acid from the second, and the lactic acid from the third, step by regeneration of the exchangers with an alkali metal compound.

5. The process of treating whey which comprises passing the whey first in contact with a cation exchange material and then with an anion exchange material to remove the mineral salts, adding mineral acid to the liquid, and heating so as to effect the inversion of the sugar contained therein, passing the liquid in contact with an anion exchange material to deacidify the liquid, and recovering the galactose and glucose formed in the liquid by evaporation and crystallization.

6. The process of treating whey which comprises passing the whey first in contact with an anion exchange material to produce a lacteal liquid of a pH of about 6.3, heating the liquid to 65 to 75° C. and removing coagulated albuminous substances from the liquid, passing the liquid in contact with an anion exchange material and subsequently in contact with a cation exchange material and again with an anion exchange material to remove the bulk of the salts, heating the liquid to about 50 to 60° C., passing the liquid in contact with an anion exchange material, and pasteurizing, concentrating, and dry-spraying the obtained liquid, thereby obtaining a substantially salt-free product of sweet taste, having a high content of sugars.

7. A process as defined in claim 6 including the step of admixing milk to the finally obtained liquid, thereby obtaining on dry-spring a sweet and physiologically favorable mixture of albuminous material, carbohydrates, vitamins, and salts.

8. A process as defined in claim 6 including the steps of admixing gelatine to the finally obtained liquid and heating the mixture to dissolve the gelatine, thereby obtaining a uniform viscous liquid, suitable for the production of beverages.

9. The process of treating whey comprising passing an amount of whey through a system of filters, the first and third filter containing a cation exchange material and the second and fourth filter containing an anion exchange material, regenerating the first and third filter, and passing a second amount of whey equal to said first amount first through said third and fourth filters and subsequently through the regenerated first and second filters, thereby obtaining albumin-lactose preparations which are substantially free of ionizable salts but still contain the calcium and phosphoric acid present in the original whey in a nonionizable state.

10. As a new food composition, a demineralized fermented liquid lacteal serum of a pH of 5, substantially free of albuminous substances.

11. As a new food composition, a dry, sweet whey product free of the taste of untreated whey, containing essentially glucose and galactose and not more than about 0.2 per cent of salts.

12. As a new food composition, a liquid product prepared from whey, containing albuminous lactose, the calcium and phosphoric acid of the whey in a non-ionizable state, and being substantially free of ionizable salts.

ERNST ABRAHAMCZIK.
HERBERT PETROVICKI.
FRIEDRICH SCHAFFERNAK.

REFERENCES CITED

The following references are of record in the file of this patent:

UNITED STATES PATENTS

| Number | Name | Date |
|---|---|---|
| 2,372,233 | Thurston | Mar. 27, 1945 |
| 2,404,367 | Durant et al. | July 23, 1946 |
| 2,437,080 | Daniel | Mar. 2, 1948 |
| 2,465,906 | Meade et al. | Mar. 29, 1949 |

OTHER REFERENCES

Tiger, H. L. and Sussman, S., "Demineralizing Solutions by a Two Step Ion Exchange Process," Industrial & Eng. Chem., Feb. 1943 (pp. 186 to 191).